4 Sheets—Sheet 1.

J. C. BIRD.

SULKY CULTIVATOR.

No. 10,959. Reissued Sept. 18, 1888.

*WITNESSES*

Edwin L. Yewell,

John Enderson Jr.

*INVENTOR*

Joseph C. Bird by Ross H. Real his Attorney

N. PETERS, Photo-Lithographer, Washington, D. C.

J. C. BIRD.

SULKY CULTIVATOR.

No. 10,959. Reissued Sept. 18, 1888.

WITNESSES

Edwin L. Yewell,

John Enders Jr.

INVENTOR

Joseph C. Bird by Rose & Read his Attorney

N. PETERS, Photo-Lithographer, Washington, D. C.

J. C. BIRD.

SULKY CULTIVATOR.

No. 10,959. Reissued Sept. 18, 1888.

WITNESSES

Edwin L. Yewell,

John Enders Jr

INVENTOR

Joseph C. Bird by Rob. H. Read his Attorney

N. PETERS, Photo-Lithographer, Washington, D. C.

J. C. BIRD.

SULKY CULTIVATOR.

No. 10,959. Reissued Sept. 18, 1888.

WITNESSES

Edwin L. Yewell,

John Enders Jr.

INVENTOR

Joseph C. Bird by Rose & Reat his Attorney

N. PETERS, Photo-Lithographer, Washington, D.C.

UNITED STATES PATENT OFFICE.

JOSEPH C. BIRD, OF RISING SUN, MARYLAND.

SULKY-CULTIVATOR.

SPECIFICATION forming part of Reissued Letters Patent No. 10,959, dated September 18, 1888.

Original No. 365,900, dated July 5, 1887. Application for reissue filed July 7, 1888. Serial No. 279,339.

*To all whom it may concern:*

Be it known that I, JOSEPH C. BIRD, a citizen of the United States, residing at Rising Sun, in the county of Cecil and State of Maryland, have invented a new and useful Improvement in Sulky-Cultivators, of which the following is a specification.

My invention relates to an improvement in sulky-cultivators; and it consists in the peculiar construction and combination of devices, that will be more fully set forth hereinafter, and particularly pointed out in the claims.

Figure 1:
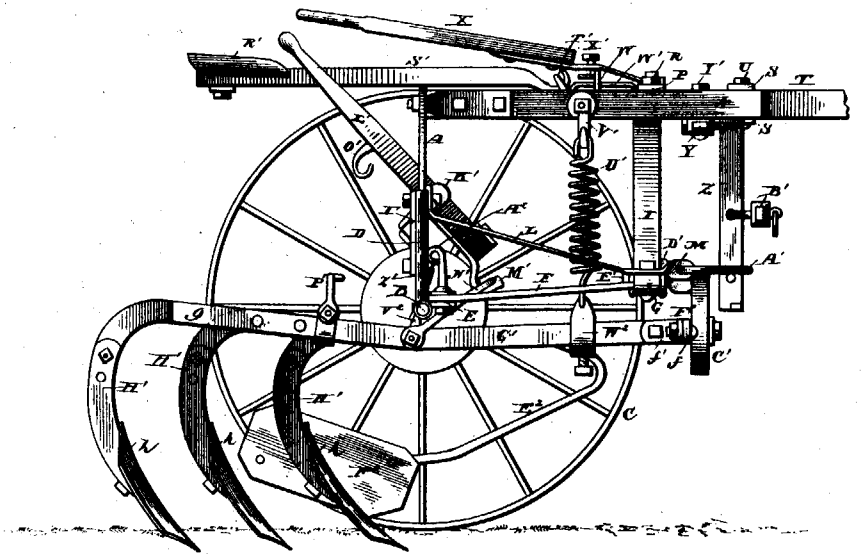
Figure 2:
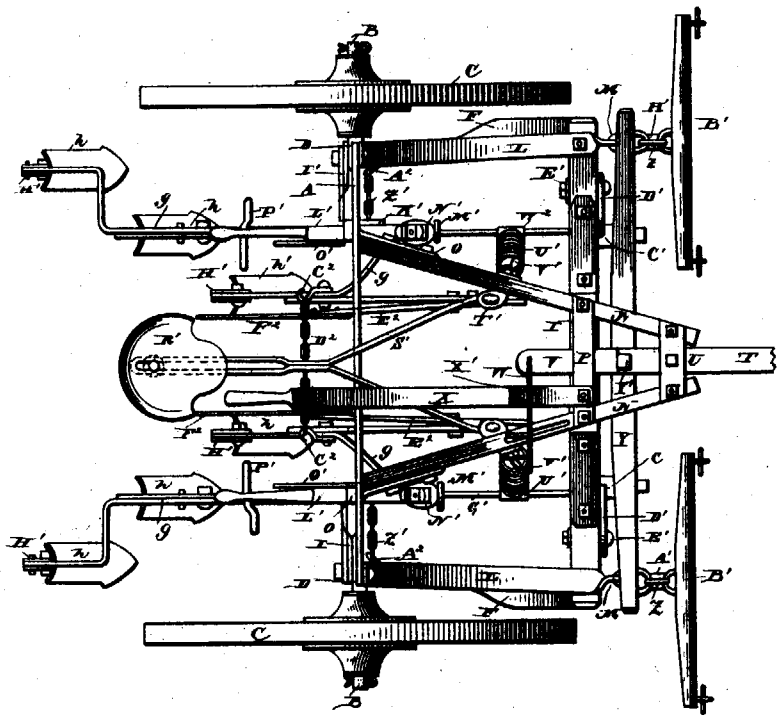
Figure 3:
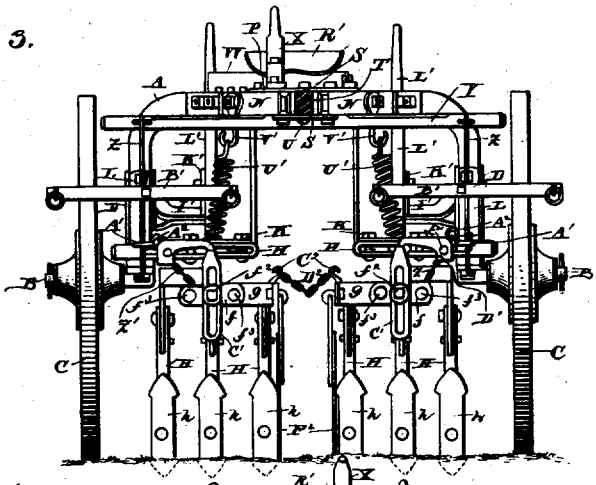
Figure 4:
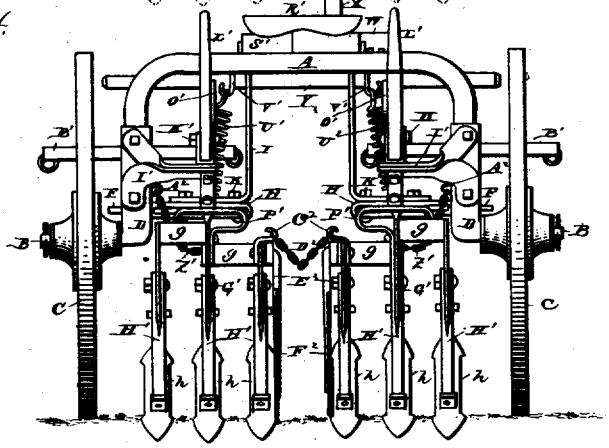
Figures 5, 6:
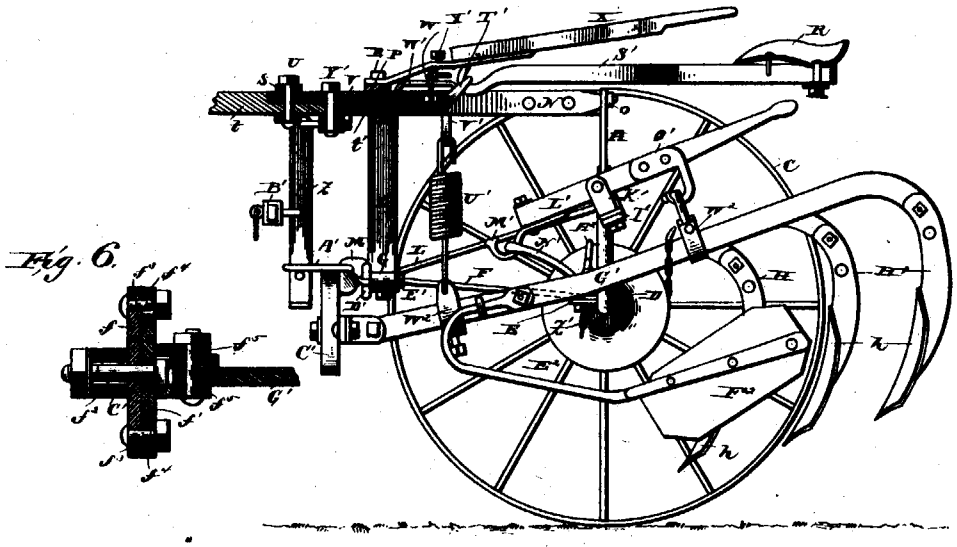

In the drawings, Figure 1 is a side elevation of a sulky-cultivator embodying my improvements, the near wheel being removed. Fig. 2 is a top plan view of the same. Fig. 3 is a front elevation. Fig. 4 is a rear elevation. Fig. 5 is a longitudinal sectional view. Fig. 6 is a detail horizontal sectional view.

A represents an arched axle, which is provided with the horizontal outwardly-extending spindles B, on which are journaled the supporting-wheels C. The spindles are formed integrally with the standards D, that are provided on their front sides with grooves adapted to receive the lower ends of the arms of the axle, and are bolted thereto. From the lower front sides of the standards D project horizontal ears E. Draw-bars F have their rear ends bolted to the said ears, and the front ends of the said draw-bars are provided with arms G, which are bent at right angles to the draw-bars, and project inwardly therefrom toward each other. The said arms G are provided with longitudinal horizontal slots H. These draft-bars and their slotted arms are made of metal.

I represents a vertical yoke, which is bent substantially in the form of an inverted letter and the lower ends of the vertical arms of said yoke are provided with outwardly-extending feet, which are secured on the upper side of the slotted arms G by means of bolts K, that extend transversely through the said feet and through the said arms.

L represents inclined brace-rods, which have their rear ends secured to the vertical arms of the bent axle at a suitable height above the draft-bars F, and the front ends of the said brace-rods are bolted to the outer ends of the draft-bars, and have their extreme front ends projecting from the front sides of the outer ends of the arms G to form ears M.

N represents the hounds, which have their rear ends attached to the arched axle by means of strap-bolts O, and the said hounds are secured near their front ends on the upper side of the horizontal central portion of the yoke I. A cross-bar, P, connects the said hounds at a point above the yoke I, and bolts R pass vertically through the horizontal portion of the yoke, through the hounds, and through the cross-bars, so as to secure the same rigidly together. The extreme front ends of the hounds are connected by means of plates S, which are bolted to their upper and lower sides, and between the said plates the rear end of the draft-pole T is secured by means of a pivotal bolt, U. The said draft pole or tongue comprises two sections, $t$ $t'$, which are secured together by a loose lap-joint at the point through which the pivotal bolt passes, and thereby the front and rear sections of the tongue are adapted to play slightly independently of each other to prevent excessive rigidity of the tongue, and prevent the same from annoying the horses by moving their collars laterally on their necks when the cultivator is in motion. On the upper side of the rear section, $t'$, is secured a metallic plate or arm, V, which extends rearwardly beyond the extreme rear end of the tongue, and to the said arm is pivoted a detent-link, W, the lower edge of which is provided with a longitudinal series of rack-teeth adapted to engage a metallic flange, W′, that is secured to the upper side of one of the hounds.

X represents a hand-lever, which has its front end pivoted to the cross-bar P and extends rearwardly therefrom, the said lever being connected to the detent link by a pivotal bolt, X′, whereby the said link may be secured to the flange W′ at any desired point, so as to shift the tongue from one side to the other, and thereby regulate the side draft of the cultivator.

Y represents a doubletree, the central portion of which is pivotally connected to the under side of the tongue by means of a bolt, Y′. Link-bars Z depend from the ends of the doubletree and are pivotally connected thereto, and the lower ends of the said link-bars are connected to the brace-rods L by means of open links A′, which are attached to the ears M and engage the lower ends of the link-bars.

B′ represents whiffletrees, one of which is connected to each of the link-bars.

C′ represents vertical clevises, which are provided with vertical slots, and at the upper end of the said clevises are formed rearwardly-extending heads, which are adapted to enter the horizontal slots in the arms G.

D′ represents hooks which are adapted to engage openings made in the heads of the clevises, and the said hooks are secured upon pivotal bolts E′, which extend transversely through the slots in the arms G and have nuts on their rear threaded ends. The said pivotal bolts may be shifted laterally in the slotted arms and secured thereto at any desired adjustment by turning the nuts, and thereby the clevises, which are movable laterally with the said shifting bolts, and the hooks pivoted thereto may be secured at any desired lateral adjustment to the slotted arms.

F′ represents draw-heads, comprising plates $f$ and $f'$, which are pivotally connected together by means of bolts $f^2$, which pass through central openings made in the said plates, and also extend through the vertical slots made in the clevises. These pivoted bolts have their front ends threaded, and are provided with clamping-nuts, by means of which the draw-heads may be secured to the clevises at any desired vertical adjustment. The plates $f'$ are provided near their extremities with transverse slots $f^4$. Clamping-bolts $f^3$ extend through the ends of the plates $f$ and also through the slots $f^4$, and are provided on their threaded ends with nuts. It will be observed that the plates $f'$ are adapted to turn on the rear sides of the plates $f$, and that the said plates $f'$ may be secured at any desired inclination by means of the clamping-bolts $f^3$. From the rear sides of the turning-plates $f'$ project ears $f^5$.

G′ represents cultivator-beams, which have their front ends secured between the ears $f^5$ by means of pivotal bolts. The said cultivator-beams have their rear ends curved downwardly.

$g$ represents extended arms, which are bolted to opposite sides of the cultivator-beams, one of the said arms being in advance and the other being in rear of the downturned end of each cultivator-beam, and the said arms $g$ extend laterally from opposite sides of the cultivator-beams and have their rear ends also curved downwardly.

H′ represents standards, which are curved, as shown, and have their upper ends attached to the curved depending ends of the cultivator-beams and their arms, and to the lower ends of the said curved standards are attached curved reversible cultivator teeth or shovels $h$. By reason of the turning-plates with which the draw-heads are provided the cultivator-beams may be inclined laterally to any desired angle, so as to cause the cultivating-shovels to run at equal depths in the ground. The clamping-bolts $f^3$ serve to secure the turning-plates of the draw-heads at the requisite inclination, and thus keep the cultivator-beams inclined when once set.

I′ represents inwardly-extending horizontal arms, which have their outer ends bifurcated and secured on the rear sides of the standards D by the same bolts which secure the said standards to the arms of the arched axle. To the inner ends of the said arms I′ are swiveled keepers K′.

L′ represents hand-levers, which are pivotally connected to the keepers K′, and are provided at their front ends with hooks M′, connected to the cultivator-beams by means of links N′.

O′ represents hooks, which are attached to the said levers on the inner sides thereof, and at a suitable distance in rear of the keepers K′. One function of the levers L′ is to raise and lower the rear ends of the cultivator-beams, so that the cultivator-teeth may be raised entirely from the ground or forced downwardly therein to the required depth. Another function of said levers is to shift the cultivator-beams laterally.

To each cultivator-beam, at a suitable distance from its rear end, is bolted a stirrup, P′. The said stirrups are adapted to receive the feet of the driver, who sits upon a seat, R′, that is supported upon the rear end of an arm, S′. The said arm rests upon the central portion of the arched axle, and the front bifurcated ends thereof are hooked to eyes T′, with which the hounds are provided. By this means the seat may be very readily detached from the sulky. The upper outer sides of the stirrups are curved forwardly, and are thereby arranged out of line with the remaining portions of the upper sides of the stirrups. When the levers L′ have their rear ends depressed, the cultivators are raised until the stirrups strike against the lower sides thereof. The said levers then have their rear ends moved inwardly toward each other, which causes the rear ends of the cultivator-beams to be diverged, and also causes the depending hooks O′ to engage the upper sides of the stirrups, so as to suspend the cultivator-beams from the rear ends of the levers.

In order to facilitate the operation of raising the cultivators from the ground, I provide coiled retractile springs U′, the upper ends of which are connected to hooks V′, with which the hounds are provided, and the lower ends of which springs are connected to keepers $W^2$, which are secured to the cultivator-beams near their front ends. These keepers are longitudinally adjustable on the cultivater-beams, and are provided with set-screws $W^3$, by means of which they may be clamped to the cultivator-beams at any desired adjustment. By shifting the keepers back or forth upon the cultivator-beams the tension of the springs will be regulated at will.

Z′ represents chains which are connected to hooks $A^2$, that are attached to the rear ends of the draft-bars. The said chains are adapted to be attached to hooks $V^2$, with which the cultivator-beams are provided. The inwardly-extending arms on the opposite sides of the cultivator-beams are provided with hooks $C^2$, and $D^2$ represents a chain which is adapted to connect the said hooks. By means of the chains $Z'$ and $D^2$ the lateral play of the cultivator-beams may be limited or entirely prevented, as will be readily understood.

In order to prevent the cultivator-teeth from throwing dirt upon tender plants when the same are being cultivated, I provide the inner-extending arms of the cultivator-beams with rearwardly-extending arms $E^2$, to which are attached fenders $F^2$, that are adapted to run on opposite sides of the row of plants.

The operation of my invention will be very readily understood from the foregoing description and by reference to the accompanying drawings. The driver, seated upon the seat R′, directs the team, and with one foot placed in each stirrup on the cultivator-beams he keeps the plow steadily at work and moves them laterally when necessary in order to avoid obstructions. It will be noted upon inspection of the drawings that each hand and foot of the operator co-operates in controlling the movements of the cultivator-beams. The right hand and the right foot operate on the right cultivator-beam, while the left hand and the left foot operate on the left cultivator-beam. It will be further noted that while either hand pulls upon its lever the corresponding foot pushes upon the stirrup, so that the operator is given a purchase, as it were, in the simultaneous and co-operative use of hands and feet in controlling the movements of the plows. So, in like manner, the hands may push while the feet pull on the beams. When the machine is in motion and is not in operation, as when crossing a field or when in transit on a road, the cultivator-beams are elevated and are attached to the hooks which depend from the lower sides of the levers L′.

Having thus described my invention, I claim—

1. The combination of the cultivator-frame having the horizontal transverse slotted arms G at its front end, the vertically-slotted clevises attached to the slotted arms G and adjustable laterally thereon, and the cultivator-beams having their front ends pivotally connected to the clevises and adjustable vertically thereon, substantially as described.

2. The combination of the sulky-frame having the clevises, the draw-heads attached to the clevises and having the turning-plates, and the cultivator-beams attached to the said turning-plates, substantially as described.

3. In a sulky-cultivator, the draw-heads having the turning-plates adapted for the attachment of the cultivator-beams, and the clamping-bolts to secure the turning-plates at any desired inclination, substantially as described.

4. The sulky-frame having the clevises provided with the vertical slots, in combination with the draw-heads comprising the plates $f$ $f'$, the bolts $f^2$, to pivot the said plates together and passing through the slots in the clevises and thereby attaching the draw-heads thereto, and the plates $f'$ being thereby adapted to turn, and being provided with ears for the attachment of the front ends of the cultivator-beams, substantially as described.

5. In a sulky-cultivator, the combination of the frame, the cultivator-beams pivotally connected thereto at their front ends, and the springs depending from the frame and having their lower ends attached to the cultivator-beams and longitudinally adjustable thereon, substantially as described.

6. In a sulky-cultivator, the combination of the frame, the cultivator-beams having their front ends pivotally attached thereto, the springs depending from the frame, and the keepers longitudinally adjustable on the cultivator-beams and connected to the lower ends of the springs, substantially as described.

7. In a sulky-cultivator, the combination of the frame, the cultivator-beams having their front ends pivotally connected thereto and provided with the stirrups for the feet of the driver, and the levers fulcrumed to the frame and connected to the beams, the said levers having hooks adapted to engage the stirrups when the rear ends of the beams are raised to suspend the same, substantially as described.

8. The combination of two or more cultivator-beams capable of relative lateral movement, and a lever secured to the frame of the cultivator, connected with each beam, each lever being supported so as to control its beam laterally and independently.

9. The combination, with two or more cultivator-beams capable of relative vertical and lateral movement, of a controlling-lever for each beam secured to the frame of the cultivator, said lever having one end attached to the beam, each beam being provided with a stirrup, whereby any beam may be independently controlled by a combined push and pull of the foot and hand of an operator.

10. The combination of the sulky-frame having the horizontal slotted arms G, the clevises secured to the said slotted arms and laterally adjustable therein, and the cultivator-beams connected to the clevises, substantially as described.

11. The combination of the sulky-frame, the laterally-adjustable clevises attached thereto, the cultivator-beams having their front ends attached to the clevises, and the levers fulcrumed to keepers swiveled to the frame, the said levers being connected to the cultivator-beams and adapted to shift the latter laterally and raise or lower them, substantially as described.

12. The sulky-frame comprising the arched axle, the hounds attached thereto, the draft-bars extending forwardly from the lower ends of the arched axle and having the arms G at their front ends, and the brace-yoke connecting the hounds and the arms G, substantially as described.

13. The sulky-frame comprising the arched axle, the hounds attached thereto, the draft-bars extending forwardly from the lower ends of the arched axle and having the arms G at their front ends, the brace-yoke connecting the hounds and the arms G, and the brace-rods L, connecting the axle with the front ends of the draft-bars, substantially as described.

14. The combination of the sulky-frame having the hounds, the plates S, connecting their front ends, and the cross bar P, connecting the hounds in rear of the plates S, the tongue having its rear end passed between the plates S, the said tongue comprising the two sections *t* and *t'*, loosely lap-jointed and bolted together, the section *t'* bearing under the cross-bar P, and the shifting-lever connected to the said section *t'*, substantially as described.

15. The combination of the sulky-frame having the slotted arms G, the clevises having the heads inserted in the slots in the arms and laterally adjustable therein, the laterally-adjustable clamp-bolts in the slots of the arms and having the hooks to engage the heads of the clevises, substantially as described.

In testimony that I claim the foregoing as my own I have hereto affixed my signature in presence of two witnesses.

JOSEPH C. BIRD.

Witnesses:
H. H. REYNOLDS,
CLINTON I. WHITE.